US005650184A

United States Patent [19]

Humphry et al.

[11] Patent Number: 5,650,184
[45] Date of Patent: Jul. 22, 1997

[54] COATED FEED AGGLOMERATES AND METHODS OF MAKING THE SAME

[75] Inventors: R. Kim Humphry; Norman A. Lubbe; Bruce R. McClain, all of Quincy, Ill.; Mark D. Newcomb, Columbia, Mo.

[73] Assignee: Moorman Manufacturing Company, Quincy, Ill.

[21] Appl. No.: 391,937

[22] Filed: Feb. 21, 1995

[51] Int. Cl.$^6$ .............................. A23L 1/05; A23L 1/302; A23L 1/305; A23P 1/08
[52] U.S. Cl. .............................. 426/89; 426/293; 426/285; 426/623; 426/630; 426/103; 426/573; 426/576
[58] Field of Search .............................. 426/89, 293, 285, 426/623, 630, 103, 573, 576, 101

[56] References Cited

U.S. PATENT DOCUMENTS

| | | |
|---|---|---|
| 1,286,766 | 12/1918 | Post . |
| 2,152,438 | 3/1939 | McHan . |
| 3,139,342 | 6/1964 | Linskey . |
| 3,450,540 | 6/1969 | Graham et al. . |
| 3,677,771 | 7/1972 | Kolar, Jr. . |
| 3,679,429 | 7/1972 | Mohrman et al. . |
| 3,930,031 | 12/1975 | Kealy . |
| 3,976,806 | 8/1976 | Ziccarelli . |
| 4,034,126 | 7/1977 | Funakoshi et al. ............... 427/8 |
| 4,039,687 | 8/1977 | Weyn . |
| 4,076,847 | 2/1978 | Johnson et al. . |
| 4,089,984 | 5/1978 | Gilbertson ............... 426/293 |
| 4,161,545 | 7/1979 | Green et al. . |
| 4,542,032 | 9/1985 | Miller . |
| 4,552,774 | 11/1985 | Gronfor . |
| 4,670,251 | 6/1987 | Blanco . |
| 4,692,342 | 9/1987 | Gannis et al. . |
| 4,769,248 | 9/1988 | Wilkins et al. . |
| 4,780,325 | 10/1988 | Miller . |
| 4,822,625 | 4/1989 | Gannis et al. . |
| 4,828,858 | 5/1989 | Holloway, Jr. et al. . |
| 4,935,250 | 6/1990 | Cox . |
| 4,942,043 | 7/1990 | Sander . |
| 4,961,943 | 10/1990 | Blanthorn et al. . |
| 4,981,697 | 1/1991 | Miller et al. . |
| 5,009,899 | 4/1991 | Miller et al. . |
| 5,061,499 | 10/1991 | Holloway, Jr. et al. . |
| 5,085,874 | 2/1992 | Jungvid . |
| 5,098,718 | 3/1992 | Ardaillon et al. . |
| 5,149,562 | 9/1992 | Hebert et al. . |
| 5,213,826 | 5/1993 | Miller et al. . |
| 5,250,308 | 10/1993 | Alexander et al. . |
| 5,258,187 | 11/1993 | Shimada . |
| 5,260,078 | 11/1993 | Spicer . |
| 5,270,064 | 12/1993 | Shultz . |
| 5,298,268 | 3/1994 | Maegli . |
| 5,356,642 | 10/1994 | Patterson et al. . |

*Primary Examiner*—Esther Kepplinger
*Assistant Examiner*—Choon P. Koh
*Attorney, Agent, or Firm*—Lockwood, Alex, FitzGibbon & Cummings

[57] ABSTRACT

Coated animal feed agglomerates such as pellets are made starting with uncoated agglomerates or pellets that may be formed of easily agglomerated or pelleted ingredients but which may be lacking in desirable nutritional or other ingredients. A binder such as a viscous aqueous gel is coated onto the uncoated agglomerates or pellets. Thereafter, the damp binder coated agglomerates or pellets are dusted with a powder containing ingredients which usually are not amenable to being extruded. After the dusting powder has been applied the coated and dusted pellets are dried and cooled.

27 Claims, 1 Drawing Sheet

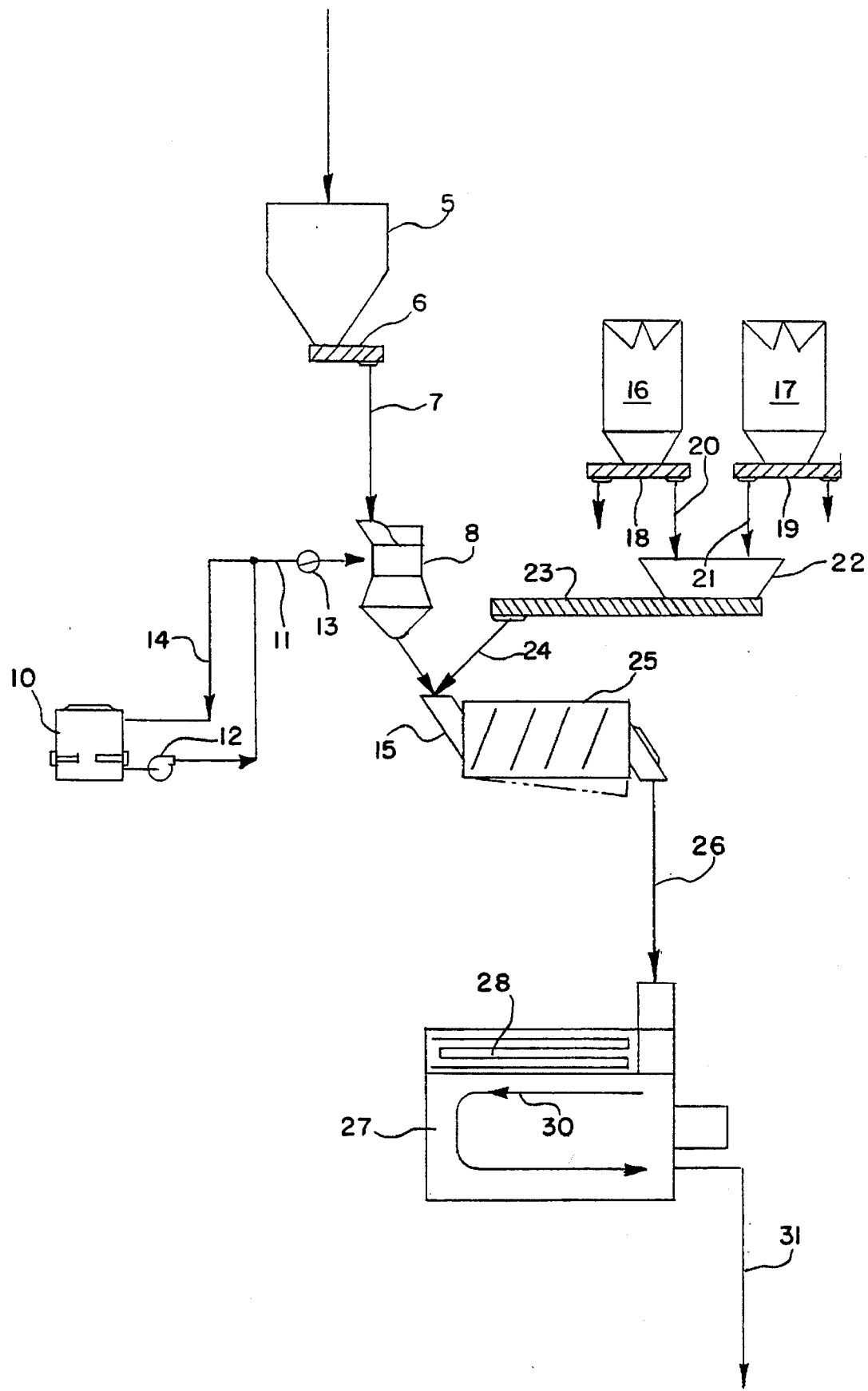

COATED FEED AGGLOMERATES AND METHODS OF MAKING THE SAME

SUMMARY OF THE INVENTION

This invention relates broadly to coated feed agglomerates and to methods of making the same. It relates more particularly to coated animal feed pellets for the livestock industry. As used herein the term "agglomerates" is intended to mean and include one or more feed ingredients in the form of pellets, granules, chunks, nuggets, lumps, briquettes, crumbles or other shapes and forms. Presently, an important embodiment of the invention relates to coated animal feed pellets comprising cylindrical agglomerations of various lengths resulting from the extrusion of feed mash through a pellet mill die and to the methods of applying the coating thereon.

It is well known that feed agglomerates such as animal feed pellets are formulated so as to compromise a plurality of ingredients incorporated in various proportions depending on their particular nutritional, flavor enhancing, agglomerating, extrusion ability and/or other desired values and properties. Heretofore, in the production of feed agglomerates there have been limitations on either the inclusion, or the level of inclusion of certain desirable or required ingredients such as those which are heat-labile and/or difficult to pelletize or otherwise form into agglomerates in production. For example, pelletized rations containing appreciable quantities of milk derived ingredients such as whey protein concentrate and whey permeate have unacceptable upper limits on their inclusion rates or concentrations since they are heat-labile and unable to withstand the frictional heat generated during extrusion through a pellet die at a normal production speed. Accordingly, when heat-labile ingredients have been present, extrusion and pelleting rates have been inherently slow and unacceptable. Previous efforts to overcome these limitations have generally been concentrated on adding lubricants to achieve better extrusion rates or the use of thinner relief dies so as to reduce frictional heat. However, pellet durabilities have suffered when lubricants and/or thinner dies have been used.

In accordance with the present invention it has been found that heat-labile ingredients, and in particular milk derived ingredients such as whey protein concentrate and whey permeate may be incorporated on feed agglomerates, particularly animal feed pellets at desired inclusion rates by using certain novel coating procedures. Heretofore, coatings have been applied to various rations in the form of pellets or other shaped agglomerates, primarily in order to improve their palatability, the object being to place highly palatable ingredients or additives where they are readily tasted. For example, one method used in the pet food industry is to spray pet foods with fat and then dust on low levels of palatability enhancers. Another method has been to use a concentrated aqueous solution of a coating material and then dry to the desired moisture level. However, these prior procedures and expedients have not been adequately useful in producing feed agglomerates such as animal feed pellets which contain all the desired nutritional or other ingredients in their desired or optimum rates of inclusion.

The object of the invention, generally stated, is the provision of feed agglomerates particularly animal feed pellets and methods of commercially making the same, wherein base aggregates, particularly uncoated nutritionally incomplete pellets are formulated so as to be readily extrudable or otherwise formable and then have coatings deposited thereon which may contain heat-labile ingredients and/or higher than normally allowable inclusion levels of ingredients which are difficult to extrude or otherwise form into aggregates. According to the method of coating of the invention, base aggregates such as animal feed pellets are first coated with a binder which may be in the form of a viscous gel, an aqueous solution of gelatin being an example. After application of the binder, while the agglomerates or pellets are still moist, they receive a coating in powder form of nutritional ingredients which are not amenable to being extruded and which may or may not be heat-labile but which are difficult to pelletize or extrude at the inclusion rates in the coatings.

For a complete understanding of the nature and scope of the invention, reference may be had to the following detailed description thereof taken in conjunction with the accompanying drawing.

DESCRIPTION OF THE DRAWING

The accompanying drawing is a flow sheet or diagram of a presently preferred process and equipment by which the invention has been satisfactorily practiced to make coated feed aggregates, specifically coated animal feed pellets.

Referring to the drawing, the equipment shown therein comprises a bin or hopper 5 in which a supply of uncoated animal feed pellets is maintained. The uncoated pellets may be formulated so as to contain ingredients which allow the pellets to be readily extruded or otherwise formed. The uncoated pellets may or may not be of good enough quality to be fed as produced. Even if they are nutritionally sound they can be made better by application of a coating containing beneficial ingredients. If not of good enough quality to be fed by themselves as produced, the uncoated pellets can be upgraded and rendered suitable for feeding by application of a suitable coating. In either case the coated pellets or aggregates must be free flowing and capable of withstanding the usual handling procedures.

The uncoated or base pellets are withdrawn from the bottom of the bin 5 by a metering screw 6 of known type and discharged through chute or line 7 into the top of a coater 8 such as a commercially available rotary disc coater. As the uncoated pellets are being metered into the coater 8 a liquid binder is also metered into the upper portion of the coater 8 from a supply tank 10 through a line 11 in which a pump 12 and flow meter 13 are located. Excess binder is recirculated to the tank 10 through return line 14. The liquid binder may be a viscous aqueous solution of gelatin. The coater 8 serves to evenly deposit a coating of the binder on the surfaces of the pellets as they pass through. The surfaces of the coated pellets are damp as they are discharged from the bottom of the coater 8 into the inlet 15 at one end of a rotary drum 25.

In passage through the rotary drum 25 the damp coated pellets receive a coating mixture in powder form comprising ingredients which do not lend themselves to being either incorporated, or being incorporated in the desired concentrations, in the mass from which the uncoated aggregates are formed or extruded in the case of the uncoated pellets. By way of example, the coating powder may contain a mixture of whey permeate, whey protein concentrate, enzymes, microbials, starch, flour and/or blood plasma. The dry coating powder mixture may be prepared in the dry ingredient bins 16 and 17 the bottom outlets of which discharge into reversing volumetric screw feeders 18 and 19, respectively. Each screw feed has a discharge outlet into a line or chute 20, 21 which in turn discharges the dry coating mixture into the feed hopper 22 of a blending conveyor 23. It will be understood that as one bin 16 or 17 is being emptied a new batch of the coating mixture is prepared in the other bin.

From the blending conveyor 23 the dry coating mixture is discharged into a chute 24 which feeds into the inlet 15 of the rotary drum 25. Preferably, the dry coating mixture in the form of a powder is metered into the rotary drum 25 at such a rate as to at all times maintain a slight excess of the powder therein and thereby prevent coating the interior surfaces of the drum 25 and of the downstream equipment. As the damp binder coated aggregates or pellets move through the rotary drum 25 to its outlet their surfaces receive a smooth, uniform and continuous adherent surface coating of the dry powder. Preferably, the rotary drum 25 is downwardly inclined at an adjustable angle so that retention time of the contents may be controlled as required.

The coated pellets discharge from the rotary drum 25 through line 26 into the inlet of a combination dryer and cooler 27 of known commercial type which is equipped with steam heating coils 28 and a stainless steel web solid tray belt 30. In passing through the dryer/cooler 27 the coated pellets are conditioned for discharge therefrom in finished form through line 31.

The following example will serve as a description of an illustrative working example of one manner in which the invention may be practiced to make coated pellets for baby pigs.

EXAMPLE

The uncoated pellets introduced into the storage bin 5 may have a diameter of approximately ⅛ of an inch and range in length from ⅛ to ¾ inch and are formed from the following extrudable mixture.

| Ingredients | Parts by Weight |
| --- | --- |
| Corn and | 42 |
| Soybean Meal | 28 |
| Whey Prot. Conc. and Blood Plasma | 13 |
| Rolled Oats, An. Fat, Mineral Components, and Medication | 17 |

The binder in tank 10 is prepared by dissolving gelatin in warm tap water at 140-150 F. and then chilling to form a viscous liquid which can be circulated so as to remain fluid. The binder is metered into the coater 8 while uncoated pellets are being fed into the coater from the storage bin 5. The minimum dwell time in the coater 8 is that which is sufficient to allow the individual pellets to receive a coating of the binder and become damp at the surface before discharging into rotary dusting drum 25.

The dry powder in the bins is prepared by mixing in each bin dry ingredients to yield the following dusting mixture:

|  | Parts by Weight |
| --- | --- |
| Whey Protein Concentrate | 2 |
| Whey Permeate | 1 |

As the binder coated pellets move through the rotary dusting drum 25 the dusting mixture therein adheres tightly to the damp pellets and forms a smooth, continuous surface on each pellet. The adherence of the powder is aided by its hygroscopicity.

Presently, the following are considered unique and important features of the invention. The use of whey permeate as a coating utilizes the hygroscopic nature of this ingredient to "bond" it by way of the binder to the uncoated pellets. The use of an aqueous gel as the binder enables the process to keep added moisture to a minimum and prevent pellet deterioration. Whey protein concentrate acts as a carrier for the whey permeate and enables the product to be made under conditions of high humidity. The sequence of addition of binder to the uncoated pellets, and thereafter, powder to a dry chamber in a sequence process, enables the product to be made with a minimum of equipment clean-up. The use of a rotary disc type liquid applicator enables the binder to be added in a viscous form, which gives a high powder:pellet ratio and a low binder:pellet ratio. The overall process improves pellet durability, reduces the fines level and consequently reduces feed wastage.

What is claimed is:

1. The method of making coated feed agglomerates which comprises, preparing extruded feed agglomerates on which it is desired to apply a coating containing at least one ingredient which is either not included in the agglomerates as extruded or not included therein at a desired inclusion rate level, coating said extruded agglomerates with a viscous gel leaving the coated agglomerates in a damp condition, applying a powder containing said at least one ingredient to said coated agglomerates while in their damp condition, and drying the binder and powder coated agglomerates.

2. The method of claim 1, wherein said feed agglomerates are extruded animal feed pellets.

3. The method of claim 2, wherein said viscous gel is a viscous solution of gelatin.

4. The method of claim 1, wherein said powder comprises whey permeate, whey protein concentrate and starch.

5. The method of claim 4, wherein said feed agglomerates are extruded animal feed pellets.

6. The method of producing animal feed pellets which comprises, preparing easily extrudable base pellets which are not by themselves ideally suitable for animal feeding purposes in that they lack certain required levels of ingredients that are not amenable to extrusion, depositing a uniform coating of a viscous gel on at least substantially all exposed surfaces of said base pellets, dusting the gel-coated pellets while the gel coating is damp with a dusting powder containing ingredients that are not amenable to extrusion, and drying the coated pellets.

7. The method of producing animal feed pellets which comprises, preparing easily ideally extrudable base pellets which are not by themselves suitable for animal feeding purposes in that they lack certain required levels of ingredients that are not amenable to extrusion, depositing a uniform coating of a viscous gel on at least substantially all exposed surfaces of said base pellets, dusting the gel-coated pellets while the gel coating is damp with a dusting powder containing whey permeate, whey protein concentrate and starch, and drying the coated pellets.

8. The method of producing animal feed pellets which comprises, preparing easily extrudable base pellets which are not by themselves ideally suitable for feeding purposes in that they lack certain required levels of nutritional ingredients and are lacking in acceptable palatability, depositing a uniform coating of a viscous gel on at least substantially all exposed surfaces of said base pellets, dusting the gel-coated base pellets while the gel coating is still damp with a dusting powder containing whey permeate, whey protein concentrates, starch and flavor enhancer, and drying the gel-coated and dusted pellets.

9. The method of claim 6, wherein said viscous gel is an aqueous solution of gelatin.

10. The method of claim 7, wherein said viscous gel is an aqueous solution of gelatin.

11. The method of claim 8, wherein said viscous gel is an aqueous solution of gelatin.

12. The method of claim 7, wherein said viscous gel is applied to said base pellets in a liquid coater wherein said viscous gel is fed onto a rotating disc and thereby sprayed centrifugally onto a curtain of base pellets formed within said coater.

13. The method of claim 7, wherein said damp gel-coated base pellets and said dusting powder are introduced into the upper end of an inclined rotating drum and are discharged from the lower end thereof into a dryer.

14. The method of claim 8, wherein said viscous gel is applied to said base pellets in a liquid coater in which said viscous gel is metered onto a rotating disc and thereby sprayed centrifugally onto a curtain of said base pellets formed within said coater, and wherein said gel-coated pellets and said dusting powder are introduced into the upper end of an inclined rotating drum.

15. Agglomerates made in accordance with the method of claim 1.

16. Pellets made in accordance with the method of claim 2.

17. Pellets made in accordance with the method of claim 3.

18. Agglomerates made in accordance with the method of claim 4.

19. Pellets made in accordance with the method of claim 5.

20. Pellets made in accordance with the method of claim 6.

21. Pellets made in accordance with the method of claim 7.

22. Pellets made in accordance with the method of claim 8.

23. Pellets made in accordance with the method of claim 9.

24. Pellets made in accordance with the method of claim 10.

25. Pellets made in accordance with the method of claim 11.

26. Pellets made in accordance with the method of claim 12.

27. Pellets made in accordance with the method of claim 13.

* * * * *